United States Patent [19]

Weiler

[11] Patent Number: 5,231,916
[45] Date of Patent: Aug. 3, 1993

[54] COLD-WORKED PISTON FOR HYDRAULICALLY OPERATING BRAKE

[75] Inventor: Rolf Weiler, Eppstein, Fed. Rep. of Germany

[73] Assignee: Alfred Teves GmbH, Frankfurt am Main, Fed. Rep. of Germany

[21] Appl. No.: 768,651

[22] PCT Filed: Nov. 16, 1990

[86] PCT No.: PCT/EP90/01959

§ 371 Date: Oct. 1, 1991

§ 102(e) Date: Oct. 1, 1991

[87] PCT Pub. No.: WO91/12445

PCT Pub. Date: Aug. 22, 1991

[30] Foreign Application Priority Data

Feb. 8, 1990 [DE] Fed. Rep. of Germany ....... 4003731

[51] Int. Cl.$^5$ .............................. F16J 1/00
[52] U.S. Cl. ...................... 92/172; 92/168; 29/888.04; 29/888.049
[58] Field of Search ............ 92/168 B, 172; 29/888.04, 888.045, 888.049; 188/72.4, 73.31, 73.43, 73.44, 370

[56] References Cited

U.S. PATENT DOCUMENTS

| 3,490,343 | 1/1970 | Afanador et al. ............... 92/168 B |
| 3,502,004 | 3/1970 | Schrader ........................... 92/168 B |
| 3,532,030 | 10/1970 | Margetts ..................... 29/888.04 X |
| 3,917,032 | 11/1975 | Hoffman, Jr. et al. .......... 188/73.44 |
| 4,193,179 | 3/1980 | Confer et al. ................... 29/888.04 |
| 4,227,292 | 10/1980 | Kipling .................... 29/188.011 X |
| 4,228,726 | 10/1980 | Rinker et al. ..................... 92/168 B |
| 4,630,345 | 12/1986 | Lutz ............................... 29/888.061 |
| 4,887,449 | 12/1989 | Kanai et al. ................ 29/888.04 X |

FOREIGN PATENT DOCUMENTS

| 304103 | 2/1989 | European Pat. Off. . |
| 1750662 | 5/1976 | Fed. Rep. of Germany . |
| 76735 | 6/1981 | Japan ................. 29/888.04 |
| 90130 | 7/1981 | Japan ................. 29/888.04 |
| 91930 | 4/1989 | Japan ................. 29/888.04 |

Primary Examiner—Edward K. Look
Assistant Examiner—Todd Mattingly
Attorney, Agent, or Firm—Robert P. Seitter; J. Gordon Lewis

[57] ABSTRACT

For the elimination of distortion of a thin walled cold formed brake piston the piston (1) perimeter wall (5) is stiffened by one or more formed grooves (3) and one or more inwardly projecting ridges each formed by a corresponding groove. The shaping of the groove is carried out so that the wall thickness within the critical range (2) is at least equal to the wall thickness of the piston wall (4). The grooves may be used for securing a sealing cup, a rubber seal and/or a retaining spring for the brake pads.

12 Claims, 2 Drawing Sheets

COLD-WORKED PISTON FOR HYDRAULICALLY OPERATING BRAKE

BACKGROUND OF THE INVENTION

Pistons which act on the carrier plate of brake pads are required for the actuation of hydraulically operated brakes. As a rule, such pistons are cast and then machined. In order to lower the cost of manufacture of such pistons, which are required in huge numbers, it has been proposed to fabricate them without machining, for example by extrusion processes or by hydromechanical forming operations. In this context, the European patent application published without examination, No. 304,103 has, for example, become known. Such pistons have comparatively thin wall thicknesses, and when subjected to the considerable hydraulic forces required to brake larger vehicles, the perimeter wall of the piston may very well be radially distorted. This distortion may cause improper sealing of the piston or improper guidance of the piston in its travel within the cylinder.

The invention has as its object to improve the loading capacity of a piston of this type and to enable a reduction in weight.

SUMMARY OF THE INVENTION

This object is attained for a piston of the type described by a piston having an inwardly projecting circumferential stiffening ridge formed by a cold worked groove formed into the perimeter of the piston. The groove-ridge feature substantially stiffens the perimeter wall of the piston at a point along the length thereof particularly subject to distortion by the axially applied hydraulic forces.

It is preferred in many instances to additionally reinforce the piston perimeter wall at the point along the length thereof which is critical as regards distortion by forming the radius of a curvature between the ridge and the inner surface of the perimeter wall to be larger by the thickness of the piston perimeter wall than the radius of a curvature at the bottom of the groove.

The circumferential groove may be formed by roller burnishing, in which case it may, then, be convenient to provide a plurality of grooves disposed side by side.

The grooves may be utilized to simultaneously accommodate one end of a protective cup and/or the sealing rubber. The ridge may be used as a feature to secure a pad retaining spring.

In order to further reduce any distortion of the piston, the end wall of the piston may be convexly shaped towards the open end of the piston, extending in a direction away from the axially acting hydraulic force.

DETAILED DESCRIPTION

Figure 1:
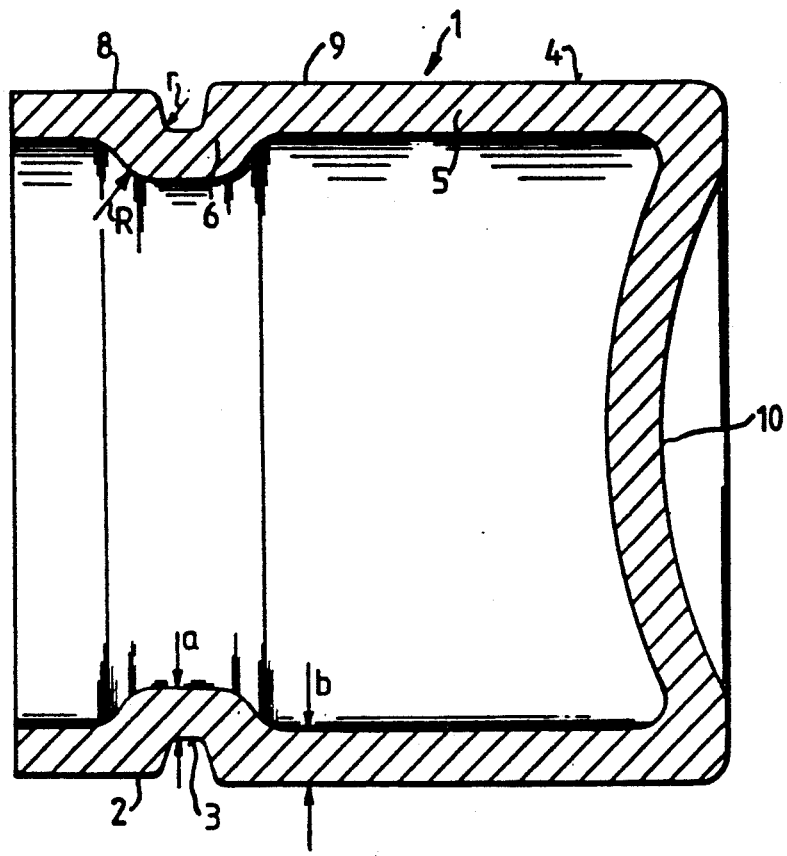
FIG. 1 shows a sectional representation of an inventive piston.
Figure 2:
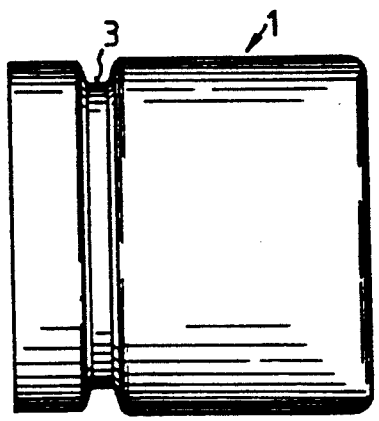
FIG. 2 is a reduced side view of the piston shown in FIG. 1.
Figure 3:
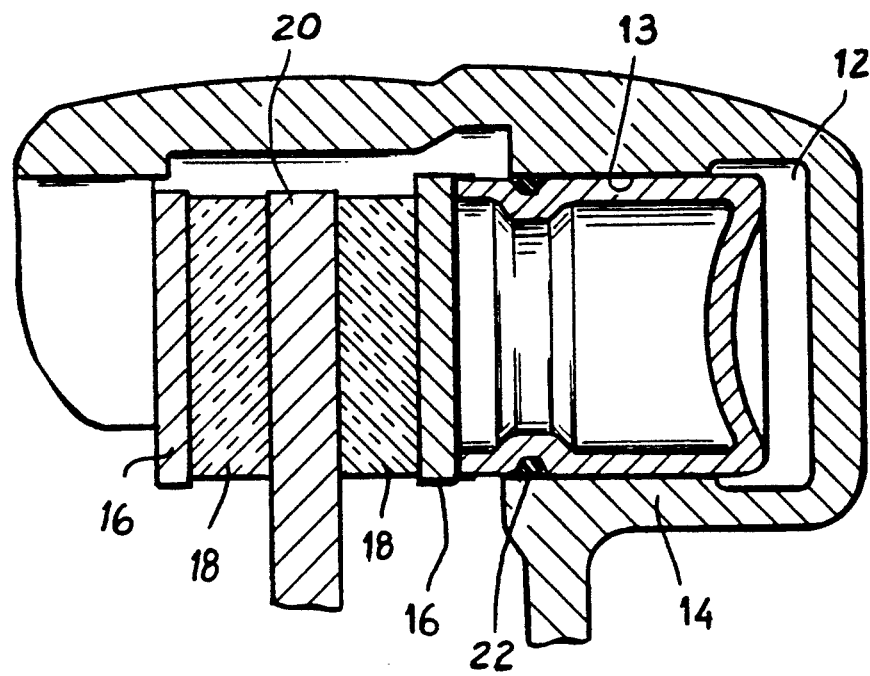
FIG. 3 is a fragmentary sectional view of the piston shown in FIGS. 1 and 2 installed in a housing, also shown in section.

The piston 1 in FIG. 1 constitutes in essence a hollow cylinder with a perimeter wall 5 and closed at one end with an endwall 10. The hydraulic forces of the brake act within a chamber 12 of a housing 14 (FIG. 3) on the piston endwall 10 which in the position shown in FIGS. 1 and 3 will, as a result, move to the left in a bore 13 of the housing 14, and with its lefthand open end as viewing FIG. 1 and engage a carrier plate 16 of a brake pad 18 (FIG. 3). The pad 18 is thereby forced against the brake disc 20 in the manner well known in the art.

The piston perimeter wall 5 has a generally uniform wall thickness "b", which perimeter wall thickness is comparatively thin. Hydraulic forces acting on the piston endwall 10 cause the piston perimeter wall 5 to distort to a pronounced extent in a critical range 2 along the length of the piston 1, range 2 lying between axial location 8 and 9 in the example of FIG. 1. This distortion may cause the cylinder perimeter wall 5 to bulge outwardly in that range. As a consequence, the bulging may interfere with the fit of the piston within the brake cylinder, which may cause the piston to jam. The distortion may also cause inward movement of the piston perimeter wall 5, creating a problem of improper sealing.

The cylindrical piston 1 may be fabricated by extrusion or by deep-drawing and consequently may have the comparatively thin weight-saving wall thickness already described above.

In order to eliminate the problems described, a circumferential groove 3 is formed into the outer surface 4 of the perimeter walls at an axial location within the critical range 2, in such a way that an inwardly projecting stiffening ridge is formed extending into the interior space within the piston 1. The forming of the circumferential groove 3 leads to a stiffening of the piston 1 by the resultant thickened wall adjacent the groove 3. The groove 3 is preferably formed by roller-burnishing, and it is important that this step does not lead to a thinning of the wall thickness "a" within the critical range 2, but rather to locally increase the wall thickness by an appropriate shaping of the tool used, so that the wall thickness "a" through the bottom of the groove in the critical range 2 comes to be at least equal to the wall thickness "b" of the remaining part of the piston. In this connection, the wall thickness should be measured at right angles to the direction of extension of the piston perimeter wall 5. As a consequence, also the radius R of the curvature between the ridge 6 and the inside surface of the piston perimeter walls should be larger at least by the amount "b" than the radius "r" of the curvature at the bottom of the circumferential groove 3.

The groove 3 which is provided for reasons of stiffness may, at the same time, be utilized in a multiple way insofar as, for example, to receive and mount one end of a protective cup; or, the rubber seal 22 sealing the piston 1 in respect of the associated cylinder bore 13 may be secured in the groove 3, as shown in FIG. 3 depending on the specific axial location of the critical range 2.

Optionally, the ridge 6 may be utilized in such a way that the spring legs of a retaining spring being secured to the rear side of the pad carrier plate can be engaged behind the ridge 6, thus retaining the brake pad in respect to the piston 1.

The convex configuration of the piston endwall 10 serves as an additional safeguard against any distortion of the outer piston perimeter wall 5 in the event of elevated forces acting on the piston bottom 10. Preferably, the curve has a parabolic shape.

Figure 4:
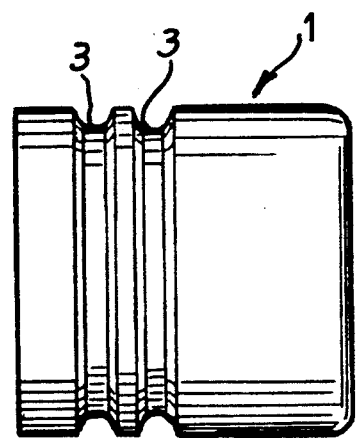
FIG. 4 is a reduced side view of an alternate form of the piston according to the present invention.

One or a plurality of grooves 3 may be formed in the piston as shown in FIG. 4.

I claim:

1. A method of manufacturing a piston for a brake wheel cylinder for an automotive brake of the type having a cylindrical piston movably disposed in a cylinder housing bore and subjected to hydraulic pressure at one end to have the other end of said piston forced into engagement with a brake pad, including the steps of:

fabricating said piston by cold forming a hollow cylinder, closed at said one end with an endwall and open at said other end, and having a perimeter wall of a predetermined thickness;

forming at least one circumferential groove extending about the perimeter of said hollow cylinder at an axial location whereat their is a pronounced tendency to distort said perimeter wall by said hydraulic pressure acting on one end thereof, said step of forming said at least on circumferential groove is carried out by displacing a section of said wall radially inward to form an inwardly projecting circumferential ridge beneath said groove;

wherein in said step of forming said at least one circumferential groove, said section of wall displaced inward is maintained at a wall thickness at least equal to the predetermined thickness of said perimeter wall of said cylinder so that the wall thickness at the bottom of the groove is equal to said predetermined thickness of said perimeter wall, whereby said piston is stiffened by said forming of said groove to resist said tendency to distort said perimeter wall.

2. The method of manufacturing according to claim 1 wherein said step of fabricating said piston is carried out by a deep drawing process.

3. The method of manufacturing according to claim 1 wherein said step of forming said at least one circumferential groove is carried out by roller burnishing.

4. The method of manufacturing according to claim 1 wherein in said step of displacing said section of perimeter wall radially inward, a curvature having a radius is formed at the bottom of said groove and a curvature having a radius is formed on said ridge, said forming step causing said radius of said ridge to be larger than the radius of curvature of said groove bottom by the thickness of said perimeter wall.

5. The method of manufacturing according to claim 1 further including the step of installing a seal in said groove sealing the outside of said piston to said housing bore.

6. The method of manufacturing according to claim 1 wherein a plurality of said grooves are formed side by side into said piston perimeter wall.

7. A piston for a hydraulically actuated brake, said piston comprising a hollow cylinder having a perimeter wall of a predetermined thickness, with an inner surface and an outer surface, said piston closed at one end with an end wall, said piston being provided adjacent the other end thereof with a circumferential groove formed into said perimeter wall surface;

said groove formed into said piston perimeter wall by a radially offset inwardly displaced section of said perimeter wall forming a circumferential inner ridge having a wall thickness at least equal to the thickness of the perimeter wall, said groove configured so that the wall thickness at the bottom of the groove is at least as thick as said predetermined perimeter wall thickness.

8. A piston as claimed in claim 1, wherein a curvature of a predetermined radius is formed in the bottom of said groove, and a curvature of a predetermined radius is also formed on said ridge, and in that said radius of said curvature of said circumferential inner ridge is larger at least by said thickness of said perimeter wall than said radius of said curvature at the bottom of said groove.

9. A piston as claimed in claim 7, wherein said position is formed with a plurality of circumferential grooves side by side and parallel to each other.

10. A piston as claimed in claim 7, wherein said piston perimeter is provided with a seal and wherein said groove receives said seal.

11. A piston as claimed in claim 7, wherein said groove receives a seal.

12. A piston as claimed in claim 1, wherein said piston end wall is convex shaped projecting towards the open end of said piston.

* * * * *